US010666740B2

(12) United States Patent
Bal et al.

(10) Patent No.: US 10,666,740 B2
(45) Date of Patent: *May 26, 2020

(54) CONTROL OF AN APPLICATION SESSION TO ACCOMMODATE DIFFERENT USERS

(71) Applicant: International Business Machines Corporation, Armonk, NY (US)

(72) Inventors: Rajmeet S. Bal, Gurgaon (IN); Dilip Kumar, Gurgaon (IN); Megha Mittal, Gurgaon (IN); Siddharth Saraya, Raniganj (IN); Chitresh Sirohi, Reading (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,772

(22) Filed: May 3, 2019

(65) Prior Publication Data

US 2019/0260835 A1    Aug. 22, 2019

Related U.S. Application Data

(63) Continuation of application No. 15/802,670, filed on Nov. 3, 2017.

(51) Int. Cl.
*H04L 29/08* (2006.01)
*H04L 29/06* (2006.01)

(52) U.S. Cl.
CPC ............ *H04L 67/143* (2013.01); *H04L 63/08* (2013.01); *H04L 67/141* (2013.01); *H04L 67/142* (2013.01); *H04L 67/02* (2013.01)

(58) Field of Classification Search
CPC ....... H04L 63/08; H04L 67/02; H04L 67/141; H04L 67/142; H04L 67/143
See application file for complete search history.

(56) References Cited

U.S. PATENT DOCUMENTS

| 6,349,337 B1 | 2/2002 | Parsons, Jr. et al. |
| 7,117,529 B1 | 10/2006 | O'Donnell et al. |
| 9,229,623 B1 | 1/2016 | Penilla et al. |

(Continued)

OTHER PUBLICATIONS

List of IBM Patents or Patent Applications Treated As Related, filed May 3, 2019.

*Primary Examiner* — June Y Sison
(74) *Attorney, Agent, or Firm* — L. Jeffrey Kelly; Edell, Shapiro & Finnan, LLC

(57) ABSTRACT

According to one embodiment of the present invention, a system comprises at least one processor and controls an application session. The system suspends a first application session of a first user conducted for an application on a computing device. A second application session is established for a second different user from the first application session and conducted on the computing device for the same application. The second application session is associated with a set of conditions for terminating the second application session. The second application session is terminated in response to occurrence of the set of associated conditions. The first application session is resumed in response to termination of the second application session. Embodiments of the present invention further include a method and computer program product for controlling an application session in substantially the same manner described above.

7 Claims, 7 Drawing Sheets

(56) References Cited

U.S. PATENT DOCUMENTS

| | | | |
|---|---|---|---|
| 2001/0030644 A1* | 10/2001 | Allport | G07C 9/00158 |
| | | | 345/173 |
| 2004/0068572 A1 | 4/2004 | Wu | |
| 2013/0160141 A1* | 6/2013 | Tseng | G06F 21/6245 |
| | | | 726/28 |
| 2014/0157378 A1 | 6/2014 | Childs et al. | |
| 2016/0292404 A1 | 10/2016 | Tseng et al. | |
| 2017/0019394 A1 | 1/2017 | Yastrebenetsky et al. | |
| 2017/0180344 A1 | 6/2017 | Gupta | |

\* cited by examiner

CONTROL OF AN APPLICATION SESSION TO ACCOMMODATE DIFFERENT USERS

BACKGROUND

1. Technical Field

Present invention embodiments relate to control of application sessions, and more specifically, to suspending an active application session for an initial user on a computing device to establish a secondary application session for another user on that same computing device for the same application.

2. Discussion of the Related Art

Computing devices have become commonplace, and have created a market for applications that are installed and executed on these computing devices. The computing devices include, for example, smartphones, tablets, laptops, and other portable computing devices; desktops; etc. The applications typically require a user to create a user account to enable the applications to be utilized. Many applications are emerging in the marketplace with each application offering different benefits. Although a user may have a user account for an application, the user may not have access to their computing device at a particular time in order to access the application at that time.

In some cases, the user may have access to a computing device of another person. This may occur when the user is with another person and desires to use the computing device of the other person to perform a simple operation within an application. For example, when using a review tool for source code, a user may receive a review comment while discussing the source code at a location of another person within a workplace. In order to reply to the comment, the user returns to a location of their computing device in the workplace to access the review tool.

In another example, a user may be shopping in a supermarket and become aware of a discount of 15% by paying bills through a payment application. Although the user has a user account for the payment application, the payment application is not installed on a mobile computing device of the user, such as a smartphone, etc. Although the user may install the payment application in order to receive the discount, this approach requires Internet connectivity in order to install the payment application on the user mobile computing device and receive the discount. If the payment application is not able to be installed on the user mobile computing device, the user cannot receive the discount. For example, the application may not be able to be installed when no mobile data is left on the user plan, no Wi-Fi connectivity is available, a mobile storage issue arises, etc.

Alternatively, the user may attempt to use a computing device of another person. For example, a person standing in a checkout line next to the user in the supermarket may have the payment application installed on their mobile computing device. In this case, the person exits their user account to enable the user to use the mobile computing device of the person to access (or log in to) the payment application through a corresponding account of the user and retrieve the discount. However, this approach is a time consuming and tedious procedure, and raises security issues due to the use of the mobile computing device by an unknown user.

SUMMARY

According to one embodiment of the present invention, a system comprises at least one processor and controls an application session. The system suspends a first application session of a first user conducted for an application on a computing device. A second application session is established for a second different user from the first application session and conducted on the computing device for the same application. The second application session is associated with a set of conditions for terminating the second application session. The second application session is terminated in response to occurrence of the set of associated conditions. The first application session is resumed in response to termination of the second application session. Embodiments of the present invention further include a method and computer program product for controlling an application session in substantially the same manner described above.

BRIEF DESCRIPTION OF THE DRAWINGS

Generally, like reference numerals in the various figures are utilized to designate like components.

DETAILED DESCRIPTION

Figure 1:
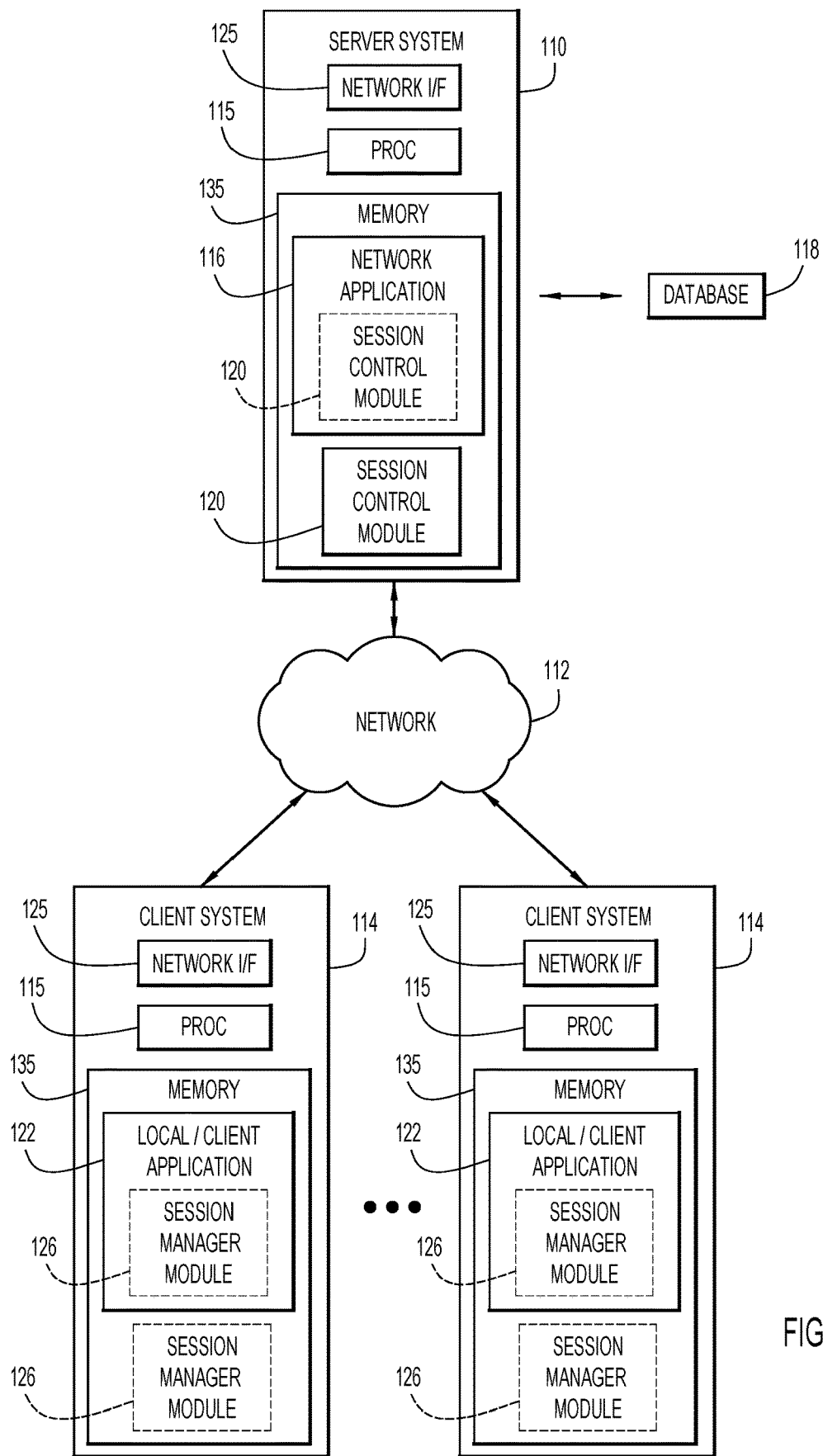
FIG. 1 is a diagrammatic illustration of an example computing environment employing local applications according to an embodiment of the present invention.

Present invention embodiments enable more than one user to access the same application from respective user accounts simultaneously on the same computing device. For example, the application may include a local or client application, or a network or web-based application, where the application may be simultaneously accessed by the different users from the same application window. An application session for an initial user of the application is suspended, and a secondary application session for another user is established for the application for a predetermined duration. For example, the secondary application session may be based on a time interval or a quantity of permitted actions. In response to expiration of the predetermined duration, the secondary application session is automatically terminated so that the other user is automatically exited from their user account for the application, and the application session for the initial user is resumed.

Present invention embodiments enable authentication of the other user from the application session of the initial user to establish the secondary application session. The secondary application session enables the other user to perform limited actions within the application. Present invention embodiments may employ fingerprint authentication, voice-based recognition, or other verification schemes to allow operations by known users on computing devices of other persons.

The secondary application sessions of present invention embodiments may be applied to social media to enable certain actions to be accomplished from various computing devices. For example, these actions may include providing small comments, indicating approval of objects through posts, comments, images, videos, and the like. For example, a friend may be showing a latest picture from a social media site displayed on a smartphone to a user at a location, and an approval of the picture is desired to be posted by the user at that time. However, a corresponding application for the social media site needs to be installed on a mobile computing device of the user and accessed in order to post the approval, or the user needs to travel to a location of a user computing device accessing the social media site to post the approval. Present invention embodiments enable the approval to be posted by the user from their user account on the smartphone of the friend while the friend is accessing their user account, thereby providing the approval to the user account of the friend.

Present invention embodiments provide a mechanism to enable users to access their user accounts of applications on computing devices of other persons using any authentication mechanism, such as a fingerprint scanner, a voice recognition system, etc. The users may perform any one time or limited operations through the computing devices of other persons where the other person also has a user account with the same application and has been authenticated (or logged in) to that application, thereby avoiding efforts to use the computing devices of the users to access the same applications or installing those applications on the computing devices of the users.

An example environment for use with present invention embodiments is illustrated in FIG. 1. Specifically, the environment includes one or more server systems 110, and one or more client or end-user systems 114. Server systems 110 and client systems 114 may be remote from each other and communicate over a network 112. The network 112 may be implemented by any number of any suitable communications media, such as a wide area network (WAN), a local area network (LAN), Internet, Intranet, etc. Alternatively, server systems 110 and client systems 114 may be local to each other, and communicate via any appropriate local communication medium, such as a local area network (LAN), hardwire, wireless links, Intranet, etc.

Client systems 114 enable users to interact with server systems 110 to perform desired actions with respect to various types of applications, including those for social media, financial transactions, merchant/commerce transactions, navigation, etc. Server systems 110 include a network or web-based application 116 and a session control module 120. Network application 116 may perform various types of actions with respect to a corresponding functionality based on information received from client systems 114. The functionality may pertain to social media, financial transactions, merchant/commerce transactions, navigation, etc. Session control module 120 may interact with, or be included within, network application 116 to control an application session with a user and enable application sessions with different users as described below. The application session may include interactions between an individual user and one or more applications during a time interval those applications are accessed by the individual user through a user account, preferably requiring authentication of user credentials and/or biometrics for access. By way of example, an application session may commence when a user account is accessed (or a log in occurs) and terminate upon a manual or automatic exit (or a log out) from that user account.

A database system 118 may store various information for control of the application session, such as application session parameters, credentials of authorized users, biometrics of authorized users, etc. The application session parameters may pertain to time limits, permitted actions, and the like. The database system 118 may be implemented by any conventional or other database or storage unit, may be local to or remote from server systems 110 and client systems 114, and may communicate via any appropriate communication medium, such as a local area network (LAN), a wide area network (WAN), Internet, hardwire, wireless link, Intranet, etc.

Client systems 114 may include a local (or client) application 122 that interacts with network application 116 of server systems 110 to perform desired actions. Local application 122 may be retrieved from various network sites and installed on a client system 114. The local application 122 may perform various actions with respect to a corresponding functionality based on information received from the server systems 110 and a user. By way of example, local application 122 may perform at least some of the functionality of, and/or other functions in addition to, those performed by network application 116. In this case, the local application 122 communicates with the network application 116 to retrieve and provide information to the server systems 110 to, for example, perform actions on the client systems 114, provide requests to commit actions to the server systems 110, and the like. However, the functionality of network application 116 may be distributed among the network application 116 and local application 122 in any desired fashion.

The client systems 114, via local application 122, may present a graphical user or other interface to solicit information from users pertaining to the desired actions, and may provide reports including results of the desired actions. The interface may include a GUI, command line prompts, menu screens, etc., while the results of the actions may include communications, numerical results, confirmations, etc. The client systems 114 further include a session manager module 126 that may interact with, or be a plug-in or otherwise included within, local application 122 to control an application session with a user and enable application sessions with different users as described below.

Server systems 110 and client systems 114 may be implemented by any conventional or other computer systems, such as a laptop, desktop, tablet, smartphone or other mobile computing device, etc. The server systems 110 and client systems 114 are preferably equipped with a display or monitor, a base, optional input devices, and any commercially available and custom software. The base preferably includes at least one hardware processor 115, such as a microprocessor, controller, central processing unit (CPU), etc., one or more memories 135, and internal or external network interfaces or communications devices 125. The communications devices may include a modem, network cards, etc., while the input devices may include a keyboard, mouse, touch screen, or other input device. The software may include server/communications software, session control module 120, session manager module 126, browser/ interface software, local applications 122, network applications 116, etc., and is provided for execution by at least one hardware processor 115.

The session control module 120 and session manager module 126 may include one or more modules or units to perform the various functions of present invention embodiments described below. The session control module 120 and session manager module 126 may be implemented by any combination of any quantity of software and/or hardware modules or units, and may reside within memory 135 of the server systems 110 and/or client systems 114 for execution by processor 115.

By way of example, a user may be at a location with another person and be registered with (or have a corresponding user account for) an application for which the other person is engaged in an active application session. The user may desire to utilize the application to perform desired actions, but does not have separate access to the application. In one instance, the user may not have access to a computing device with the application installed to perform the desired actions. For example, the other person may show the user a picture from an active session on a social media site displayed on a smartphone. The user has an account on the social media site and desires to respond to the picture, but does not have access to a computing device with an installed application providing access to the social media site.

Present invention embodiments provide a mechanism to enable users to access their user accounts of applications on computing devices of other persons using any authentication mechanism, such as a fingerprint scanner, a voice recognition system, etc. The users may perform any one time or limited operations with respect to the applications from the computing devices of other persons, where the other person also has a user account with the same application and has been authenticated (or logged in) to that application.

Figure 2:
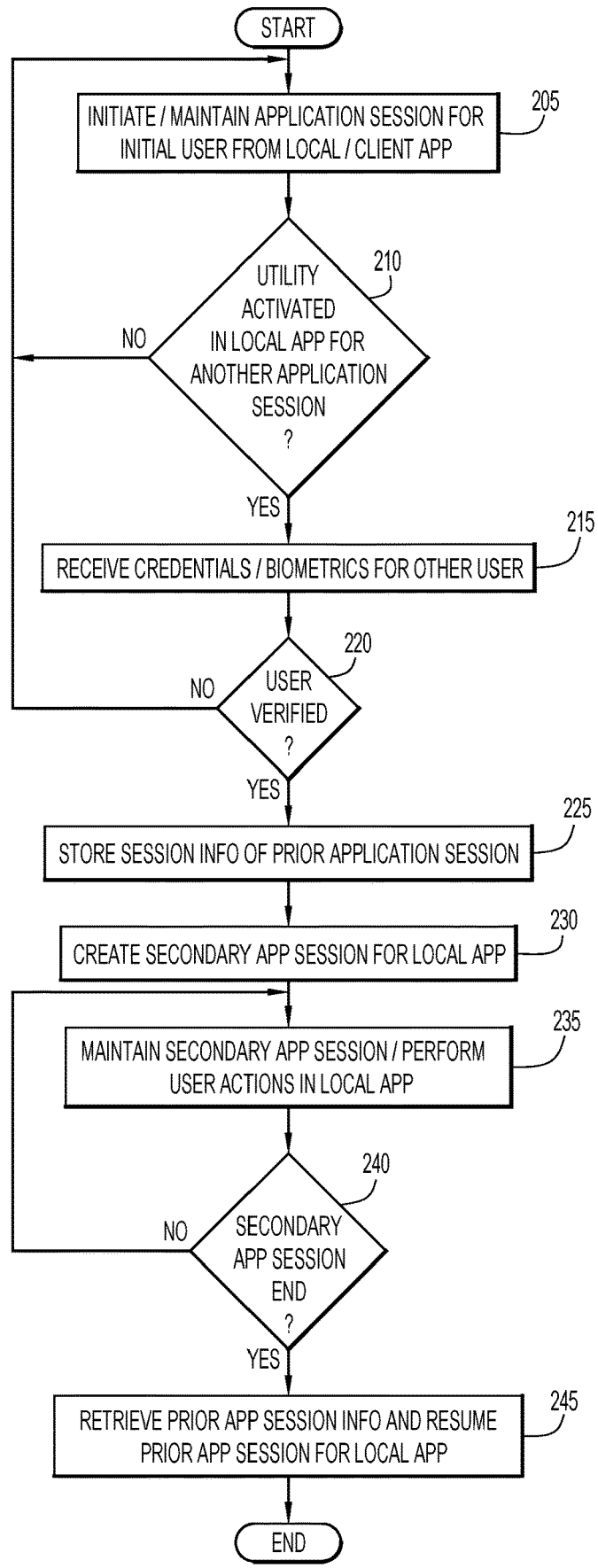
FIG. 2 is a procedural flowchart illustrating a manner of a client system providing a secondary application session with a local application according to an embodiment of the present invention.

A manner of establishing a secondary application session from an application session being conducted with a local application 122 on a computing device according to an embodiment of the present invention is illustrated in FIG. 2. Initially, an application session for an initial user is established on a client system 114. The application session enables the initial user to interact with a local application 122 for which the initial user is registered. For example, the user possesses a user account with a username and passcode or other authentication credentials. The client system may include authentication specific to the initial user to enable access to the client system. The authentication may include: a fingerprint scan, voice recognition, facial recognition, or other biometric authentication; user identification; passcode; etc.

The initial user actuates local application 122 and provides user credentials and/or biometrics to establish the application session at step 205. Local application 122 interacts with a corresponding network application 116 of a server system 110 to perform desired actions, and provides the credentials and/or biometrics of the initial user to the corresponding network application 116 to authenticate the initial user as described below. Once the initial user is authenticated or verified, desired actions may be performed by the initial user within the local application 122 for the application session. This may be accomplished by the local application 122 interacting with the corresponding network application 116 to exchange information and commit desired actions to the server system 110.

During the application session, a utility provided by session manager module 126 of client system 114 may be actuated to request a secondary application session for a second user from client system 114 of the initial user. The actuation may include a key, mouse click, and/or other input entered into client system 114. When the utility is actuated as determined by session manager module 126 at step 210, the session manager module 126 receives credentials and/or biometrics of the second user and initiates user authentication at step 215. The credentials may be entered into the client system 114 by the second user via various input devices, such as a touch screen, keyboard, voice/speech recognition, user interface, etc. The biometrics may be entered into the client system 114 through various sensors, such as a fingerprint scanner, microphone, image capture device, etc.

For example, an icon or button on a display of client system 114 may be actuated, and the credentials and/or biometrics may be received from the second user. The credentials and/or biometrics are sent from the session manager module 126 of client system 114 to session control module 120 of server system 110 for authentication of the second user as described below.

A message or notification is received by session manager module 126 of client system 114 from the server system 110 indicating results of the authentication. Once the user is authenticated or verified as determined at step 220, session manager module 126 stores session information of the application session for the initial user at step 225. The session information may include various parameters, operational and other states, conditions, etc. For example, the session information of the application session for the initial user may be stored in one or more cookie files for the secondary application session of the second user. The session manager module 126 of client system 114 further directs the local application 122 to suspend the application session of the initial user, and establish a secondary application session for the second user at step 230. This may be accomplished by resetting and/or modifying the session information for local application 122 to pertain to the second user based on the credentials and/or other information associated with the second user. Session control module 120 of server system 110 may reset and/or modify the session information for corresponding network application 116 to pertain to the second user based on the credentials and/or other information associated with the second user. For example, the local application 122 and/or network application 116 may be transitioned to a state reflecting the second user accessing (or logged in to) the local application through their user account.

Once the secondary application session is established for the second user, desired actions may be performed by the second user from the client system 114 of the initial user through the user account of the second user via interaction between local application 122 and corresponding network application 116 at step 235. In other words, the secondary application session enables the second user to access the client system 114 of the initial user and perform desired actions while the initial user remains logged in to the local application 122. The utility may be re-actuated to authenticate the second user in order to commit one or more desired actions to the corresponding network application 116 (and server system 110).

The secondary application session is associated with various parameters to control the types of actions permitted within and/or the duration of the secondary application session. For example, the secondary application session may permit a certain quantity of actions to be performed, may be active for a desired time interval including a predetermined quantity of minutes, hours, etc., may be terminated in response to a command from the initial user or the second user, or may be terminated in response to a request to establish an application session for the initial user or another user.

By way of example, the secondary application session may terminate in response to committing a desired action for the second user to the server system 110 where a response is received indicating the desired action was committed, or after expiration of a time interval. The second user may not access the computing device of the initial user after the time interval expires. Further, the secondary application session may be terminated when the initial user or another user may actuate the utility to establish an application session. In the cases of expiration of the time interval or other users requesting establishment of an application session, any changes or actions requested by the second user are discarded. In addition, the secondary application session preferably limits the second user to performing actions within local application 122 and does not provide access to other components of client system 114 of the initial user, such as other applications, tools, utilities, etc. Further, since the user account of the initial user is active (not exited or logged out), the initial user is restricted from using their user account on other client systems 114 during the secondary application session.

The parameters for the secondary application session are stored in database system 118 and accessible to session control module 120 of server system 110. The parameters may be stored based on particular users requesting the secondary application session, thereby providing different constraints on the secondary application session for different users. The constraints may include a time interval, a quantity of actions, permitted/restricted actions, etc. Session manager module 126 of client system 114 receives the parameters for the secondary application session from session control module 120 of server system 110. The session manager module 126 of client system 114 monitors the desired actions performed during the secondary application session, and compares information collected during the monitoring, such as commands, a quantity of actions, elapsed time, etc., to parameters of the secondary application session received from the session control module 120 of server system 110. When conditions occur to terminate the secondary application session as determined at step 240, session manager module 126 of the client system 114 retrieves session information of the application session for the initial user, and directs local application 122 to terminate the secondary application session and resume the application session for the initial user at step 245. This may be accomplished by resetting and/or modifying the session information for local application 122 to pertain to the initial user based on the retrieved session information. For example, the local application 122 may return to a state reflecting the initial user accessing the local application 122 through their user account.

The session manager module 126 of client system 114 may further provide a message or notification to session control module 120 of sever system 110, including the session information for the application session of the initial user, to direct corresponding network application 116 to automatically exit the account of the second user (to similarly terminate the secondary application session) and resume the application session for the initial user based on the received session information. This may be accomplished by resetting and/or modifying the session information for corresponding network application 116 to pertain to the initial user based on the received session information. For example, the corresponding network application 116 may return to a state reflecting the initial user accessing the corresponding network application 116 from the local application 122 through their user account.

Alternatively, session control module 120 of server system 110 may monitor the desired actions received during the secondary application session, and compare information collected during the monitoring to parameters of the secondary application session associated with the second user retrieved from database system 118. When conditions occur to terminate the secondary application session, session manager module 126 of client system 114 receives a message or notification from session control module 120 of server system 110 indicating occurrence of those conditions. In response to the message, the session manager module 126 of client system 114 retrieves session information for the application session of the initial user, and directs local application 122 to terminate the secondary application session and resume the initial application session based on the received session information. This may be accomplished by resetting and/or modifying the session information for local application 122 to pertain to the initial user based on the retrieved session information. For example, the local application 122 may return to a state reflecting the initial user accessing the local application 122 through their user account.

The session manager module 126 of client system 114 may further provide the session information for the application session of the initial user to session control module 120 of server system 110, where the session control module 120 directs corresponding network application 116 to terminate the secondary application session and resume the application session of the initial user. This may be accomplished by resetting and/or modifying the session information for corresponding network application 116 to pertain to the initial user based on the received session information. For example, the corresponding network application 116 may return to a state reflecting the initial user accessing the corresponding network application 116 from the local application 122 through their user account.

Figure 3:
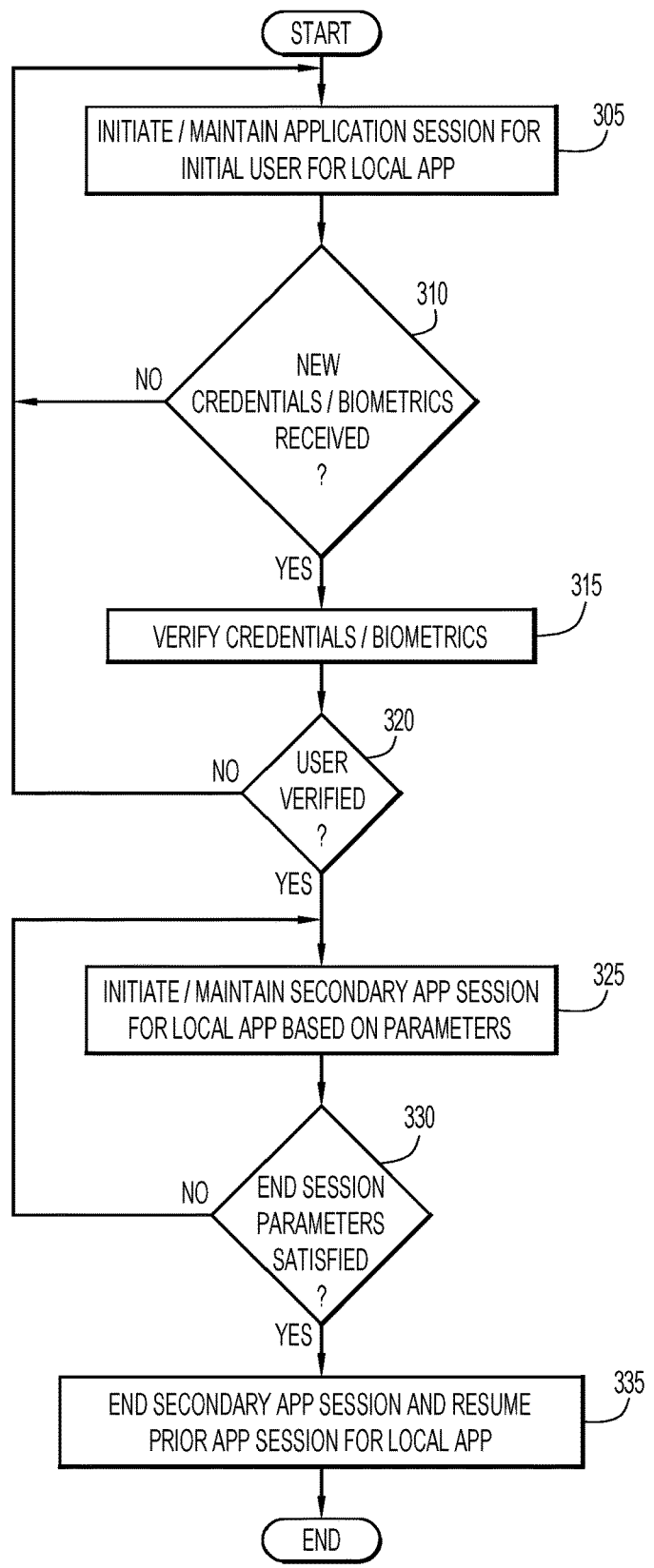
FIG. 3 is a procedural flowchart illustrating a manner of a server system providing the secondary application session with the local application according to an embodiment of the present invention.

A manner of a server system 110 establishing the secondary application session according to an embodiment of the present invention is illustrated in FIG. 3. Initially, an initial user may access a client system 114 and actuate local application 122. The local application 122 interacts with a network application 116 of a server system 110 to perform desired actions as described above. The network application 116 receives credentials and/or biometrics of the initial user from the local application 122, and compares the credentials and/or biometrics of the initial user to credentials and/or biometrics of users authorized for the local application 122 stored in database system 118. When the credentials and/or biometrics of the initial user match or correspond to those of a user authorized for the local application 122, the initial user is authenticated or verified. The results of the authentication are provided from the network application 116 to the local application 122, and the application session for the initial user is established for an authenticated or verified user as described above. The network application 116 processes requests from, and exchanges information with, the local application 122 to perform the desired actions within the application session for the initial user at step 305. The network application 116 may further commit desired actions from local application 122 to the server system 110.

When the utility is actuated during the application session for the initial user to request a secondary application session for a second user, session control module 120 of server system 110 receives credentials and/or biometrics of the second user from session manager module 126 of client system 114 at step 310. The session control module 120 of server system 110 authenticates the credentials and/or biometrics of the second user at step 315. For example, the credentials and/or biometrics may include various items, such as: a fingerprint scan, voice sample, or other biometric credentials; user identification; passcode, etc. The session control module 120 of server system 110 compares the credentials and/or biometrics of the second user to credentials, biometrics, and/or other information of users authorized for a secondary application session stored in database system 118. The database system 118 may provide separate credentials and/or biometrics for users authorized for a secondary application session from computing devices of other persons relative to users authorized for the local application. Further, the information for a particular authorized user may include credentials, biometrics, and privileges. The privileges may include applications for which the user is authorized to establish a secondary application session, permitted computing devices, times/locations for access, etc. When the privileges, credentials, and/or biometrics of the second user match or correspond to those of a user authorized for a secondary application session, the second user is authenticated or verified.

Once the second user is authenticated or verified for the secondary application session as determined at step 320, session control module 120 of server system 110 sends a message or notification indicating verification of the second user to session manager module 126 of client system 114 in order to direct session manager module 126 to store session information of the application session for the initial user, and establish the secondary application session as described above.

Once the secondary application session is established for the second user, desired actions may be performed by the second user from the client system 114 of the initial user through the user account of the second user via interaction between local application 122 and network application 116 at step 325. In other words, the secondary application session enables the second user to access the client system 114 of the initial user and perform desired actions while the initial user remains logged in to the local application 122.

The secondary application session is associated with various parameters to control the types of actions permitted within and/or the duration of the secondary application session as described above. The parameters for the secondary application session are stored in database system 118 and accessible to session control module 120 of server system 110 containing network application 116. Session control module 120 of server system 110 retrieves the parameters for the secondary application session from database system 118 and sends the parameters to session manager module 126 of client system 114 to determine occurrence of conditions for terminating the secondary application session as described above. Session control manager 120 of server system 110 receives a message or notification, including session information of the application session for the initial user, from session manager module 126 of client system 114 when conditions occur for terminating the secondary application session as determined at step 330. In response to the message, the session control module 120 of the server system 110 directs network application 116 to terminate the secondary application session and resume the initial application session at step 335. This may be accomplished by resetting and/or modifying the session information for network application 116 to pertain to the initial user based on the received session information. For example, the network application 116 may return to a state reflecting the initial user accessing the network application 116 from the local application 122 through their user account.

Alternatively, session control module 120 of server system 110 may monitor the desired actions received during the secondary application session, and compare information collected during the monitoring to parameters of the secondary application session associated with the second user retrieved from database system 118 to determine occurrence of conditions for terminating the secondary application session. When conditions occur to terminate the secondary application session, session control module 120 of server system 110 provides a message or notification to session manager module 126 of client system 114 to retrieve the session information for the application session of the initial user and direct local application 122 to terminate the secondary application session and resume the initial application session as described above. The session control module 120 of server system 110 may further receive a message or notification from the session manager module 126 of client system 114 containing the session information for the application session of the initial user, and direct network application 116 to similarly terminate the secondary application session and resume the initial application session. This may be accomplished by resetting and/or modifying the session information for network application 116 to pertain to the initial user based on the received session information. For example, the network application 116 may return to a state reflecting the initial user accessing the network application 116 from the local application 122 through their user account.

Figure 4:
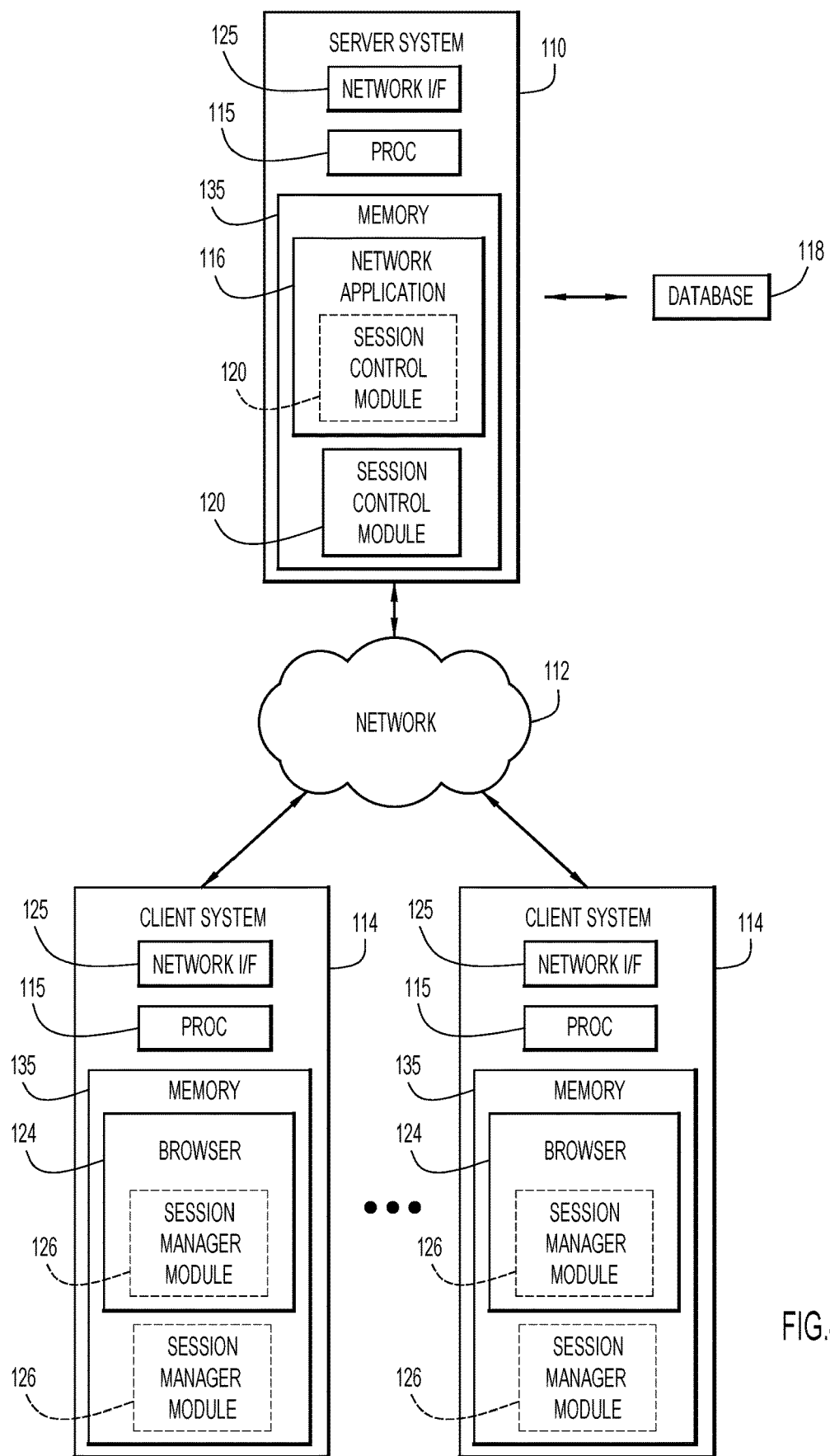
FIG. 4 is a diagrammatic illustration of an example computing environment employing a browser or other interface module according to another embodiment of the present invention.

Another example environment for use with present invention embodiments is illustrated in FIG. 4. Specifically, the environment is substantially similar to the environment described above for FIG. 1, and includes one or more server systems 110, and one or more client or end-user systems 114. Server systems 110 and client systems 114 may be remote from each other and communicate over network 112 as described above. Alternatively, server systems 110 and client systems 114 may be local to each other, and communicate via any appropriate local communication medium, such as a local area network (LAN), hardwire, wireless links, Intranet, etc.

Client systems 114 enable users to interact with server systems 110 to perform desired actions with respect to various types of applications as described above. Server systems 110 include network or web-based application 116 and session control module 120, each substantially similar to those described above. Network application 116 may perform various types of actions with respect to a corresponding functionality based on information received from client systems 114. Session control module 120 may interact with, or be included within, network application 116 to control an application session with a user and enable application sessions with different users as described below.

Database system 118 may store various information for control of the application session as described above.

Client systems 114 may include a browser or other interface module 124 that interacts with network application 116 of server systems 110 to perform desired actions. The client systems 114, via browser 124, may present a graphical user or other interface to solicit information from users pertaining to the desired actions, and may provide reports including results of the desired actions as described above. The client systems 114 further include session manager module 126 that may interact with, or be a plug-in or otherwise included within, browser 124 to control an application session with a user and enable application sessions with different users as described below.

Server systems 110 and client systems 114 may be implemented by any conventional or other computer systems, such as a laptop, desktop, tablet, smartphone or other mobile computing device, etc. The server systems 110 and client systems 114 are preferably equipped with a display or monitor, a base, optional input devices, and any commercially available and custom software. The base preferably includes at least one hardware processor 115, such as a microprocessor, controller, central processing unit (CPU), etc., one or more memories 135, and internal or external network interfaces or communications devices 125. The communications devices may include a modem, network cards, etc., while the input devices may include a keyboard, mouse, touch screen, or other input device. The software may include server/communications software, session control module 120, session manager module 126, browser/interface module 124, local applications 122, network applications 116, etc.), and is provided for execution by at least one hardware processor 115.

The session control module 120 and session manager module 126 may include one or more modules or units to perform the various functions of present invention embodiments, and may be implemented by any combination of any quantity of software and/or hardware modules or units, and may reside within memory 135 of the server systems 110 and/or client systems 114 for execution by processor 115.

Figure 5:
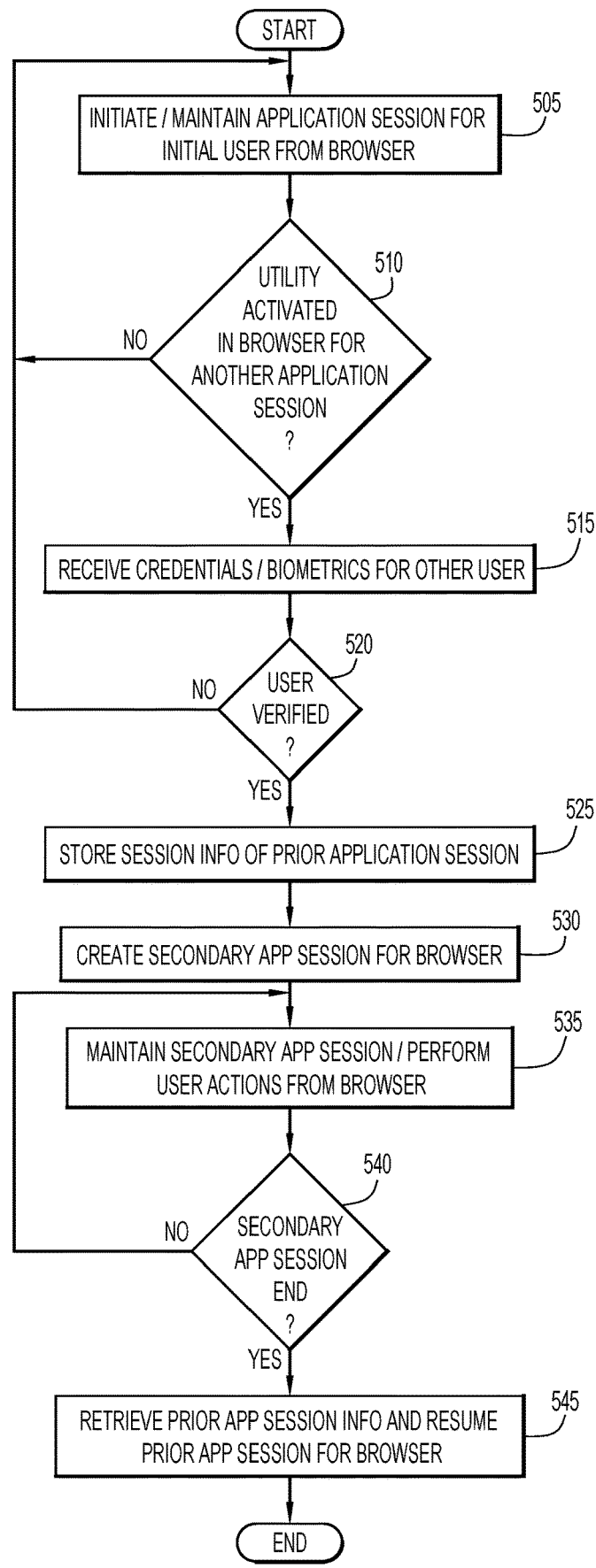
FIG. 5 is a procedural flowchart illustrating a manner of a client system providing a secondary application session with a network application through the browser or other interface module according to an embodiment of the present invention.

A manner of establishing a secondary application session from an application session being conducted on a computing device according to an embodiment of the present invention is illustrated in FIG. 5. Initially, an application session for an initial user is established on a client system 114. The application session enables the initial user to interact with a browser or other interface module 124 to access a network application 116 for which the initial user is registered. For example, the user may possess a user account with a username and passcode or other authentication credentials. The client system 114 may include authentication specific to the initial user to enable access to the client system 114. The authentication may include: a fingerprint scan, voice recognition, facial recognition, or other biometric authentication; user identification; passcode; etc.

The initial user actuates browser 124 and provides a network address or URL to access network application 116 of a server system 110. The initial user further provides user credentials and/or biometrics to establish the application session at step 505. Browser 124 interacts with the network application 116 to perform desired actions, and provides the credentials and/or biometrics of the initial user to the network application 116 to authenticate the initial user as described below. Once the initial user is authenticated or verified, desired actions may be performed by the initial user within the application 116 for the application session. This may be accomplished by the browser 124 interacting with the network application 116 to provide information to perform desired actions on the server system 110.

During the application session, a utility provided by session manager module 126 of client system 114 may be actuated to request a secondary application session for a second user from client system 114 of the initial user. The utility may be actuated via a key, mouse click, and/or other input entered into client system 114. When the utility is actuated as determined by session manager module 126 of client system 114 at step 510, the session manager module 126 receives credentials and/or biometrics of the second user and initiates user authentication at step 515. The credentials may be entered into the client system 114 by the second user via various input devices, such as a touch screen, keyboard, voice/speech recognition, user interface, etc. The biometrics may be entered into the client system through various sensors, such as a fingerprint scanner, microphone, image capture device, etc.

For example, an icon or button on a display of client system 114 may be actuated, and the credentials and/or biometrics may be received from the second user. The credentials and/or biometrics are sent from the session manager module 126 of client system 114 to session control module 120 of server system 110 for authentication of the second user as described below.

A message or notification is received by session manager module 126 of client system 114 from the server system 110 indicating results of the authentication. Once the user is authenticated or verified as determined at step 520, session manager module 126 of client system 114 stores session information of the application session for the initial user at step 525. The session information may include various parameters, operational and other states, conditions, etc. For example, the session information of the application session for the initial user may be stored in one or more cookie files for the secondary application session of the second user. The session manager module 126 of client system 114 further directs the browser 124 to suspend the application session of the initial user, and establish a secondary application session for the second user at step 530. This may be accomplished by resetting and/or modifying the session information for the browser 124 to pertain to the second user based on the credentials and/or other information associated with the second user. Session control module 120 of server system 110 may reset and/or modify the session information for network application 116 to pertain to the second user based on the credentials and/or other information associated with the second user. For example, the browser 124 and/or network application 116 may be transitioned to a state reflecting the second user accessing (or logged in to) the network application 116 through their user account.

Once the secondary application session is established for the second user, desired actions may be performed by the second user from the client system 114 of the initial user through the user account of the second user via interaction between browser 124 and network application 116 at step 535. In other words, the secondary application session enables the second user to access the client system 114 of the initial user and perform desired actions while the initial user remains logged in to the network application 116. The utility may be re-actuated to authenticate the second user in order to provide one or more desired actions to the network application 116 (and server system 110).

The secondary application session is associated with various parameters to control the types of actions permitted within and/or the duration of the secondary application session. For example, the secondary session may permit a certain quantity of actions to be performed, may be active for a desired time interval including a predetermined quantity of minutes, hours, etc., may be terminated in response to a command from the initial user or the second user, or may be terminated in response to a request to establish an application session for the initial user or another user.

By way of example, the secondary application session may terminate in response to committing a desired action for the second user to the server system 110 where a response is received indicating the desired action was committed, or after expiration of a time interval. The second user may not access the computing device of the initial user after the time interval expires. Further, the secondary application session may be terminated when the initial user or another user may actuate the utility to establish an application session. In the cases of expiration of the time interval or other users requesting establishment of an application session, any changes or actions requested by the second user are discarded. In addition, the secondary application session preferably limits the second user to performing actions within browser 124 and network application 116, and does not provide access to other components of client system 114 of the initial user, such as other applications, tools, utilities, etc. Further, since the user account of the initial user is active (not exited or logged out), the initial user is restricted from using their user account on other client systems 114 during the secondary application session.

The parameters for the secondary application session are stored in database system 118 and accessible to session control module 120 of server system 110 containing network application 116. The parameters may be stored based on particular users requesting the secondary application session, thereby providing different constraints on the secondary application session for different users. The constraints may include a time interval, a quantity of actions, permitted/restricted actions, etc. Session manager module 126 of client system 114 receives the parameters for the secondary application session from session control module 120 of server system 110. The session manager module 126 of client system 114 monitors the desired actions performed during the secondary application session, and compares information collected during the monitoring, such as commands, quantity of actions, elapsed time, etc., to parameters of the secondary application session received from the session control module 120 of server system 110. When conditions occur to terminate the secondary application session as determined at step 540, the session manager module 126 of client system 114 retrieves the session information of the application session for the initial user, and directs browser 124 to terminate the secondary application session and resume the application session of the initial user at step 545. This may be accomplished by resetting and/or modifying the session information for browser 124 to pertain to the initial user based on the retrieved session information. For example, the browser 124 may return to a state reflecting the initial user accessing the network application 116 through their user account.

The session manager module 126 of client system 114 may further provide a message or notification to session control module 120 of sever system 110, including the session information of the application session for the initial user, to direct network application 116 to automatically exit the account of the second user to similarly terminate the secondary application session and resume the initial application session based on the received session information. This may be accomplished by resetting and/or modifying the session information for network application 116 to pertain to the initial user based on the received session information. For example, the network application 116 may return to a state reflecting the initial user accessing the network application 116 from the browser 124 through their user account.

Alternatively, session control module 120 of server system 110 may monitor the desired actions received during the secondary application session, and compare information collected during the monitoring to parameters of the secondary application session associated with the second user retrieved from database system 118. When conditions occur to terminate the secondary application session, session manager module 126 of client system 114 receives a message or notification from session control module 120 of server system 110 indicating occurrence of those conditions. In response to the message, the session manager module 126 of client system 114 retrieves session information of the application session for the initial user, and directs browser 124 to terminate the secondary application session and resume the initial application session. This may be accomplished by resetting and/or modifying the session information for browser 124 to pertain to the initial user based on the retrieved session information. For example, the browser 124 may return to a state reflecting the initial user accessing the network application 116 from the browser 124 through their user account.

The session manager module 126 of client system 114 may further provide the session information of the application session for the initial user to session control module 120 of server system 110, where the session control module 120 directs network application 116 to terminate the secondary application session and resume the application session of the initial user. This may be accomplished by resetting and/or modifying the session information for network application 116 to pertain to the initial user based on the received session information. For example, the network application 116 may return to a state reflecting the initial user accessing the network application 116 from the browser 124 through their user account.

Figure 6:
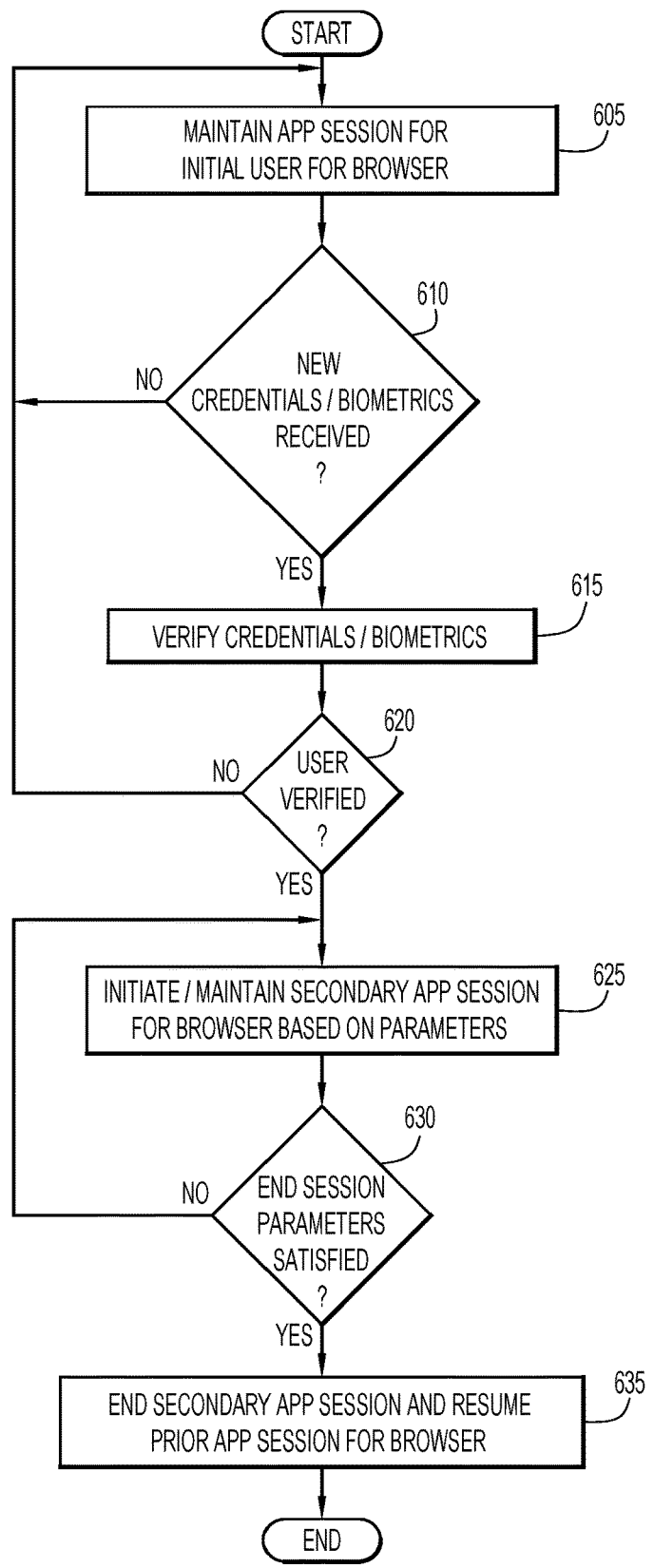
FIG. 6 is a procedural flowchart illustrating a manner of a server system providing the secondary application session with the network application according to an embodiment of the present invention.

A manner of a server system 110 establishing the secondary application session according to an embodiment of the present invention is illustrated in FIG. 6. Initially, an initial user may access a client system 114 and actuate browser 124 to access network application 116 of a server system 110. The browser 124 interacts with network application 116 of server system 110 to perform desired actions as described above. The network application 116 receives credentials and/or biometrics of the initial user from the browser 124, and compares the credentials and/or biometrics of the initial user to credentials and/or biometrics of users authorized for the network application 116 stored in database system 118. When the credentials and/or biometrics of the initial user match or correspond to those of a user authorized for the network application 116, the initial user is authenticated or verified. The results of the authentication are provided from the network application 116 to browser 124, and the application session for the initial user is established for an authenticated or verified user as described above. The network application 116 interacts with the browser 124 to perform the desired actions within the application session for the initial user at step 605. The interaction may include exchanging information, receiving desired commands, etc.

When the utility is actuated during the application session for the initial user to request a secondary application session for a second user, session control module 120 of server system 110 receives credentials and/or biometrics of the second user from session manager module 126 of client system 114 at step 610. The session control module 120 of server system 110 authenticates the credentials and/or biometrics of the second user at step 615. For example, the credentials and/or biometrics may include various items, such as: a fingerprint scan, voice sample, or other biometric credentials; user identification; passcode, etc. The session control module 120 of server system 110 compares the credentials and/or biometrics of the second user to credentials and/or biometrics of users authorized for a secondary application session stored in database system 118. The database system 118 may provide separate credentials and/or biometrics for users authorized for a secondary application session from computing devices of other persons relative to users authorized for the local application. Further, the information for a particular authorized user may include credentials, biometrics, and privileges. The privileges may include applications for which the user is authorized to establish a secondary application session, permitted computing devices, times/locations for access, etc. When the privileges, credentials, and/or biometrics of the second user match or correspond to those of a user authorized for a secondary application session, the second user is authenticated or verified.

Once the second user is authenticated or verified for the secondary application session as determined at step 620, session control module 120 of server system 110 sends a message or notification indicating verification of the second user to session manager module 126 of client system 114 in order to direct session manager module 126 to store session information of the application session for the initial user, and establish the secondary application session as described above.

Once the secondary application session is established for the second user, desired actions may be performed by the second user from the client system 114 of the initial user through the user account of the second user via interaction between browser 124 and network application 116 at step 625. In other words, the secondary application session enables the second user to access the client system 114 of the initial user and perform desired actions while the initial user remains logged in to the network application 116.

The secondary application session is associated with various parameters to control the types of actions permitted within and/or the duration of the secondary application session as described above. The parameters for the secondary application session are stored in database system 118 and accessible to session control module 120 of server system 110. Session control module 120 of server system 110 retrieves the parameters for the secondary application session from database system 118 and sends the parameters to session manager module 126 of client system 114 to determine occurrence of conditions for terminating the secondary application session as described above. Session control manager 120 of server system 110 receives a message or notification, including the session information of the initial application session, from session manager module 126 of client system 114 when conditions occur for terminating the secondary application session as determined at step 630. In response to the message, the session control module 120 of server system 110 directs network application 116 to terminate the secondary application session and resume the initial application session at step 635. This may be accomplished by resetting and/or modifying the session information for network application 116 to pertain to the initial user based on the received session information. For example, the network application 116 may return to a state reflecting the initial user accessing the network application 116 from the browser 124 through their user account.

Alternatively, session control module 120 of server system 110 may monitor the desired actions received during the secondary application session, and compare information collected during the monitoring, such as commands, a quantity of actions, elapsed time, etc., to parameters of the secondary application session associated with the second user retrieved from database system 118 to determine occurrence of conditions for terminating the secondary application session. When conditions occur to terminate the secondary application session, session control module 120 of server system 110 provides a message or notification to session manager module 126 of client system 114 to retrieve the session information of the application session for the initial user and direct browser 124 to terminate the secondary application session and resume the application session for the initial user as described above.

The session control module 120 of server system 110 may further receive a message or notification from the session manager module 126 of client system 114 containing the session information of the application session for the initial user, and direct network application 116 to similarly terminate the secondary application session and resume the initial application session. This may be accomplished by resetting and/or modifying the session information for network application 116 to pertain to the initial user based on the received session information. For example, the network application 116 may return to a state reflecting the initial user accessing the network application 116 from the browser 124 through their user account.

Figure 7:
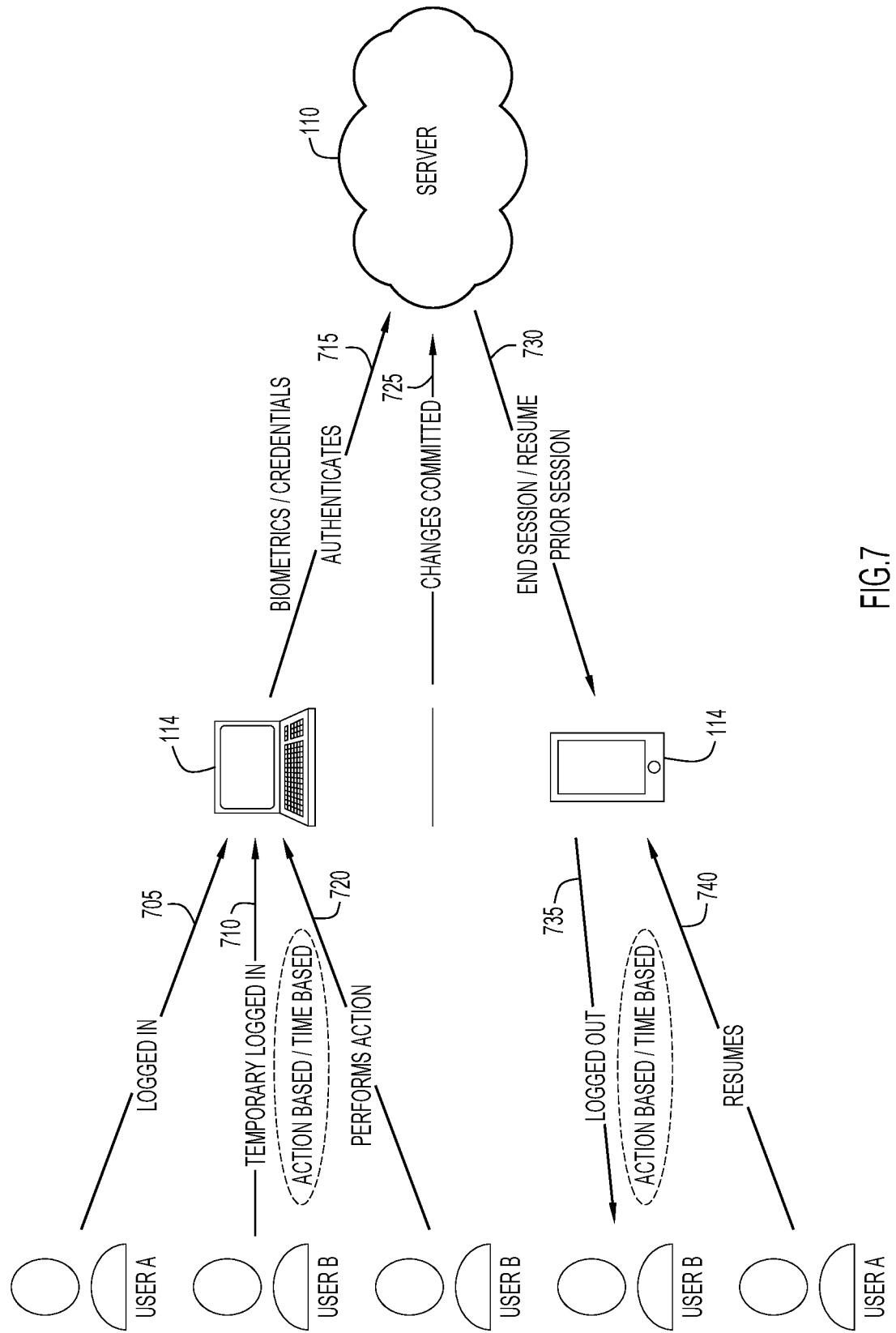
FIG. 7 is a flow diagram illustrating an example scenario for providing a secondary application session for a desired application according to an embodiment of the present invention.

An example scenario for establishing a secondary application session according to an embodiment of the present invention is illustrated in FIG. 7. Initially, User A accesses a desired application, such as a local/client application 122 or a network/web-based application 116, using a client system 114 and corresponding credentials and/or various biometrics to establish an application session at flow 705. The application session may be established through a local application 122 or a browser or other interface module 124 as described above. User B desires to perform an action within that same application using the client system 114 of User A. By way of example, User A may show User B a picture from an application session on a social media site from the client system 114 of User A. User B has a user account for the social media site and desires to respond to the picture, but does not have access to a client system 114 providing access to the social media site.

The local application 122 or browser 124 providing the application session includes a utility for requesting a secondary application session, and User B actuates the utility and provides corresponding credentials and/or biometrics at flow 710. Server system 110 authenticates User B based on the credentials and/or biometrics at flow 715, and enables User B to access the desired application on the client system 114 of User A without terminating the application session for User A. The session information of the application session for User A is stored, preferably in one or more cookie files of the secondary application session for User B.

The secondary application session for User B is created, and User B performs the desired action at flow 720. The secondary application session may be action-based with a duration limited to a predetermined quantity of actions or time-based with a duration limited to a predetermined time interval, and may be configured in server system 110 by an administrator or other user. User B is able to perform a predetermined number of actions as defined in server system 110, or any quantity of actions until expiration of a predetermined time interval. For example, User B may post an approval of the picture on the social media site.

Client system 114 of User A sends changes entered by User B to be committed to server system 110 at flow 725, and the changes are committed on behalf of User B (since User B has an application session). After receiving a response from server system 110 at flow 730, client system 114 verifies occurrence of conditions for terminating the secondary application session for User B. For example, when the secondary application session is action-based, the secondary application session may be terminated after receiving a response from server system 110 confirming completion of the action. If the secondary application session is time-based, the elapsed time of the secondary application session is examined and the secondary application session is terminated in response to expiration of a predetermined time interval.

An action quantity or time specified for User B may be posted, and User B is automatically exited from their user account at flow 735 in response to conditions indicating termination of the secondary application session. Alternatively, the secondary application session may be terminated prior to occurrence of the conditions upon a command from User B to terminate the secondary application session, or a request from another user to establish an application session. Once the secondary application session is terminated, User B cannot perform further actions with respect to the desired application on client system 114 of User A.

The session information of the application session for User A is retrieved from the one or more cookie files of the secondary application session for User B, and the application session for User A is resumed at flow 740.

It will be appreciated that the embodiments described above and illustrated in the drawings represent only a few of the many ways of implementing embodiments for controlling an application session to accommodate different users.

The environments of the present invention embodiments may include any number of computer or other processing systems, such as client or end-user systems, server systems, etc., and databases or other repositories arranged in any desired fashion, where the present invention embodiments may be applied to any desired type of computing environment. For example, the computing environment may include cloud computing, client-server, network computing, mainframe, stand-alone systems, etc. The computer or other processing systems employed by the present invention embodiments may be implemented by any number of any personal or other type of computer or processing system, such as a desktop, laptop, PDA, tablets, smartphones, mobile computing devices, etc., and may include any commercially available operating system and any combination of commercially available and custom software. The software may include browser software, communications software, server software, session control module, session manager module, local applications, network applications, etc. These systems may include any types of monitors and input devices, such as a keyboard, mouse, voice recognition, and the like, to enter and/or view information.

It is to be understood that the session control module, session manager module, and other software of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium, such as a LAN, WAN, Intranet, Internet, hardwire, modem connection, wireless, etc. For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a non-transitory computer useable medium of a stationary or portable program product apparatus or device for use with stand-alone systems or systems connected by a network or other communications medium. The computer useable medium may include magnetic or optical mediums, magneto-optic mediums, floppy diskettes, CD-ROM, DVD, memory devices, etc.

The communication network may be implemented by any number of any type of communications network, such as a LAN, WAN, Internet, Intranet, VPN, etc. The computer or other processing systems of the present invention embodiments may include any conventional or other communications devices to communicate over the network via any conventional or other protocols. The computer or other processing systems may utilize any type of wired or wireless connection for access to the network. Local communication media may be implemented by any suitable communication media, such as a local area network (LAN), hardwire, wireless link, Intranet, etc.

The system may employ any number of any conventional or other databases, data stores or storage structures, such as files, databases, data structures, data or other repositories, etc., to store information. The information may include: application session parameters including time limits, permitted actions, etc.; credentials of authorized users; biometrics of authorized users; etc. The database system may be implemented by any number of any conventional or other databases, data stores or storage structures, such as files, databases, data structures, data or other repositories, etc., to store information. The database system may be included within or coupled to the server and/or client systems. The database systems and/or storage structures may be remote from or local to the computer or other processing systems, and may store any desired data, such as application session parameters, credentials of authorized users, biometrics of authorized users, etc.

The present invention embodiments may employ any number of any type of user interface, such as a Graphical User Interface (GUI), command-line, prompt, etc., for obtaining or providing information, where the interface may include any information arranged in any fashion. The information for the interface may include desired actions, credentials and/or biometrics, communications, numerical results, confirmations, etc. The interface may include any number of any types of input or actuation mechanisms, such as buttons, icons, fields, boxes, links, etc., disposed at any locations to enter/display information and initiate desired actions via any suitable input devices. The input devices may include a mouse, keyboard, and the like. The interface screens may include any suitable actuators, such as links, tabs, etc., to navigate between the screens in any fashion.

The report may include any information arranged in any fashion, and may be configurable based on rules or other criteria to provide desired information to a user.

The present invention embodiments are not limited to the specific tasks or algorithms described above, but may be utilized for any local and/or network applications providing individual or group user access. The local application may be any application residing on an end-user computing device, such as a client application, mobile application, etc., and may access any application over a network. The network application may be any application residing on and/or accessible over a network, such as a web application, a cloud application, etc. The network application may be accessed via any type of application or interface, such as a browser, GUI, local application, etc. The present invention embodiments may be applied to a stand-alone system providing individual/group user access. In this case, the stand-alone system may perform the actions described above to establish and terminate a secondary application session.

Present invention embodiments may be applied to any application, and establish one or more secondary application sessions as described above. The secondary application sessions may be nested and established from a prior secondary application session, where termination of a secondary application session enables the prior application session to be resumed.

The application session may include any interactions between an individual user and one or more applications during a time interval those applications are accessed by the individual user. The applications may be accessed through a user account, through authentication of user credentials and/or biometrics for access, etc. An application session may be considered to commence and terminate in response to any desired conditions. For example, an application session may commence when a user account is accessed, such as when a log in occurs, a communication connection is established, etc. The application session may terminate upon a manual or automatic exit, such as when a log out occurs, a communication connection is terminated manually or due to network or other conditions, etc.

The session information may include any desired information sufficient to establish or restore an application session, such as states, conditions, parameters, credentials, etc. Authorization information used to authenticate or verify a user may include any desired information, such as: a set of one or more biometrics including a fingerprint scan, voice recognition, retinal scan, facial recognition, etc.; user identification; passcode; etc. Users may be authorized for secondary application sessions based on, or independent of, authorizations for the corresponding applications. Accordingly, separate authorization information may be maintained for applications and secondary application sessions. For example, different sets of authorization information may be stored for accessing the application and establishing a secondary application session, different sets of users may be stored for accessing the application and establishing a secondary application session, etc. For instance, a subset of users authorized for an application may be authorized for a secondary application session. Further, any desired privileges and conditions may be assigned to individual users for a secondary application session. The privileges and conditions may include particular applications and/or computing devices for which a secondary application session may be established, particular user accounts from which the secondary application session may be established, types of actions permitted/restricted for a secondary application session from particular applications, time intervals, quantity of actions, tools/utilities/applications of the computing device permitted to be accessed during the secondary application session, etc.

The utility may enable any desired inputs to be entered in order to request a secondary application session. The request may originate from any desired environment of the client system, such as from an application, browser, GUI, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of controlling an application session comprising:
    actuating a utility within an active first application session of a first user conducted for an application on a computing device to receive a request, wherein the request is for a second application session for a second different user;
    suspending the first application session in response to the request;
    establishing the second application session from the first application session and conducting the second application session on the computing device for the same application while the first user remains logged in to the application, wherein the second application session is associated with a set of conditions for terminating the second application session, and wherein the set of associated conditions includes a predetermined quantity of actions;
    terminating the second application session in response to a quantity of actions performed during the second application session reaching the predetermined quantity of actions; and
    resuming the first application session in response to termination of the second application session.

2. The method of claim 1, wherein the set of associated conditions further includes one or more from a group of: expiration of a time interval, and receiving a command from the second user to terminate the second application session.

3. The method of claim 1, wherein establishing the second application session further comprises:

authenticating the second user on the computing device based on authentication information.

4. The method of claim 3, wherein the authentication information includes one or more from a group of: a user identification, a passcode, and a set of biometrics.

5. The method of claim 1, wherein establishing the second application session further comprises:
   storing information pertaining to the first application session to resume the first application session.

6. The method of claim 5, wherein storing information further comprises:
   storing information pertaining to the first application session in one or more cookie files associated with the second application session.

7. The method of claim 5, wherein resuming the first application session further comprises:
   retrieving the information pertaining to the first application session to resume the first application session.

* * * * *